United States Patent
Tandler et al.

(10) Patent No.: US 8,739,526 B2
(45) Date of Patent: Jun. 3, 2014

(54) COMPENSATING RESERVOIR FOR A HYDRAULIC MOTOR VEHICLE BRAKE SYSTEM

(75) Inventors: Peter Tandler, Kronberg (DE); Stephan Schlicht, Nauheim (DE); Johann Ludwig, Steinbach (DE); Werner Krebs, Hambach (DE); Hans-Jürgen Neumann, Rüsselsheim (DE)

(73) Assignee: Continental Teves AG & Co. oHG (DE)

( * ) Notice: Subject to any disclaimer, the term of this patent is extended or adjusted under 35 U.S.C. 154(b) by 988 days.

(21) Appl. No.: 12/519,620

(22) PCT Filed: Dec. 11, 2007

(86) PCT No.: PCT/EP2007/063722
§ 371 (c)(1),
(2), (4) Date: Jun. 17, 2009

(87) PCT Pub. No.: WO2008/077771
PCT Pub. Date: Jul. 3, 2008

(65) Prior Publication Data
US 2010/0071361 A1 Mar. 25, 2010

(30) Foreign Application Priority Data
Dec. 23, 2006 (DE) .......................... 10 2006 061 460
May 16, 2007 (DE) .......................... 10 2007 023 070

(51) Int. Cl.
*B60T 11/26* (2006.01)
*B60T 17/22* (2006.01)

(52) U.S. Cl.
USPC ........................................................ 60/534

(58) Field of Classification Search
CPC ............................... B60T 11/26; B60T 17/225
USPC .................................................... 60/534, 585
See application file for complete search history.

(56) References Cited

U.S. PATENT DOCUMENTS

| 4,841,107 A | 6/1989 | Tandler et al. |
| 2006/0283244 A1 | 12/2006 | Schonlau et al. |

FOREIGN PATENT DOCUMENTS

| DE | 37 16 135 A1 | 11/1988 |
| DE | 10 2004 041 268 A1 | 3/2006 |
| GB | 2 202 913 A | 10/1988 |
| WO | WO 2005/024414 A2 | 3/2005 |
| WO | WO 2006/027505 A1 | 3/2006 |

*Primary Examiner* — F. Daniel Lopez
(74) *Attorney, Agent, or Firm* — RatnerPrestia

(57) ABSTRACT

A compensating tank for a hydraulic motor vehicle brake system, having a housing including a housing upper part and a housing lower part and having a device for monitoring the tank filling level of the compensating tank, including a switching unit, which is welded to the housing and has a plug connector, and including a sensor or switching element which can be switched by a transducer at a switching point S at which the switching unit generates a signal for an electronic control unit. The housing has a depression for holding the switching unit, with the switching unit having a base body composed of plastic, which base body is welded to the housing in the depression, and with the depression being provided such that the base body of the switching unit forms a planar surface with the housing.

10 Claims, 3 Drawing Sheets

COMPENSATING RESERVOIR FOR A HYDRAULIC MOTOR VEHICLE BRAKE SYSTEM

CROSS REFERENCE TO RELATED APPLICATIONS

This application is the U.S. national phase application of PCT International Application No. PCT/EP2007/063722, filed Dec. 11, 2007, which claims priority to German Patent Application No. DE 10 2006 061 460.7, filed Dec. 23, 2006 and German Patent Application No. DE 10 2007 023 070.4, filed May 16, 2007, the contents of such applications being incorporated by reference herein.

BACKGROUND OF THE INVENTION

1. Field of the Invention

The invention relates to a compensating tank for a hydraulic motor vehicle brake system, having a housing comprising a housing upper part and a housing lower part and having a device for monitoring the tank filling level of the compensating tank, comprising a switching unit, which is welded to the housing and has a plug connector, and comprising a sensor or switching element which can be switched by means of a transducer at a switching point at which the switching unit generates a signal for an electronic control unit.

2. Description of the Related Art

In a hydraulic motor vehicle brake system, the required brake fluid is located in the compensating tank, with the device for monitoring the tank filling level having for example a reed switch as a switching element and for example a magnetic transducer as a transducer. If the brake fluid level falls and the magnetic transducer passes the switching point, then the switching contacts of the reed switch close. Said signal is evaluated in a control unit and the driver of the motor vehicle can be warned by means of a visual and/or audible indication. Here, it must be ensured that the compensating tank is always filled with a minimum level of brake fluid in order to permanently ensure the function of the brake system. Use is generally made of devices for monitoring the tank filling level, in which devices a float which is provided with a magnet switches the reed contact, which is arranged on a printed circuit board, when the float assumes a position (switching point) at which the tank filling level falls below a defined minimum. A warning signal which is perceptible to the driver is triggered by means of the reed contact, with suitable countermeasures then being initiated.

A generic compensating tank is known for example from DE 37 16 135 A1. The plug connector of the switching unit is provided in a plug connector housing which is welded to a side wall which projects from the plug connector housing. It is considered to be a disadvantage of the known compensating tank with regard to packaging and transport that the switching unit projects from the upper side of the compensating tank.

On account of the high filling pressures which occur when the motor vehicle brake system is filled with brake fluid on the production lines of automobile manufacturers, the demands made on the welded connections of the upper part and switching unit are becoming ever higher. The known compensating tanks no longer meet said demands, and leaks and shifts in the switching point occur on account of defective welded connections.

SUMMARY OF THE INVENTION

It is therefore an object of the invention to provide a compensating tank which is improved in this regard.

Said object is achieved according to aspects of the invention in that the housing has a depression for holding the switching unit, with the switching unit having a base body composed of plastic, which base body is welded to the housing in the depression, and with the depression being provided such that the base body of the switching unit forms a planar surface with the housing. The base body therefore does not project from an upper side of the housing and thereby cannot have any hindering effect either during transportation or during assembly of the compensating tank. The fact that the switching unit is held in the depression permits pre-positioning, such that the welding of the switching unit to the housing upper part can be improved.

In compensating tanks for a hydraulic motor vehicle brake system, the depression is preferably provided in the housing upper part, since the device for monitoring the tank filling level is generally arranged on an upper side of the compensating tank. The device may however also be provided on an underside of the compensating tank, with the depression for holding the switching unit then being arranged in the housing lower part.

According to one advantageous embodiment, means for the positioned welding of the switching unit are provided in the depression of the housing, with the means being suitable for defining and ensuring an axial position of the switching point in relation to a longitudinal axis of the compensating tank. In this way, precise welding can be achieved without a complex tool construction, by virtue of the respective welding allowances of the switching unit and housing being situated opposite one another correctly. A defective welded connection as a result of laterally offset welding allowances can be prevented.

The means are preferably provided on an underside of the base body and in the depression.

Simple production of the compensating tank is obtained in that at least one projection-recess arrangement is provided as means for positioned welding, with the projection being provided on the underside of the base body of the switching unit and with the recess being arranged in the region of the depression.

The defined position of the switching point can be ensured if welding allowances on the housing and on an underside of the base body are adapted to the projection-recess arrangement.

A particularly compact compensating tank is obtained if a plug connector housing of the plug connector is provided so as to be radially offset in the direction of the housing in relation to a longitudinal axis of the base body.

The switching unit preferably has a support element which is arranged at right angles to the base body and which is connected to the base body and on which the sensor or switching element is arranged and which projects into a tank interior space.

These and other aspects of the invention are illustrated in detail by way of the embodiments and are described with respect to the embodiments in the following, making reference to the Figures.

BRIEF DESCRIPTION OF THE DRAWINGS

Further features, advantages and possible uses of the invention can be gathered from the following description of an exemplary embodiment and on the basis of the drawing, which shows an embodiment. Here, in highly schematic form and partially in section in each case.

DETAILED DESCRIPTION OF THE PREFERRED EMBODIMENTS

Figure 1:
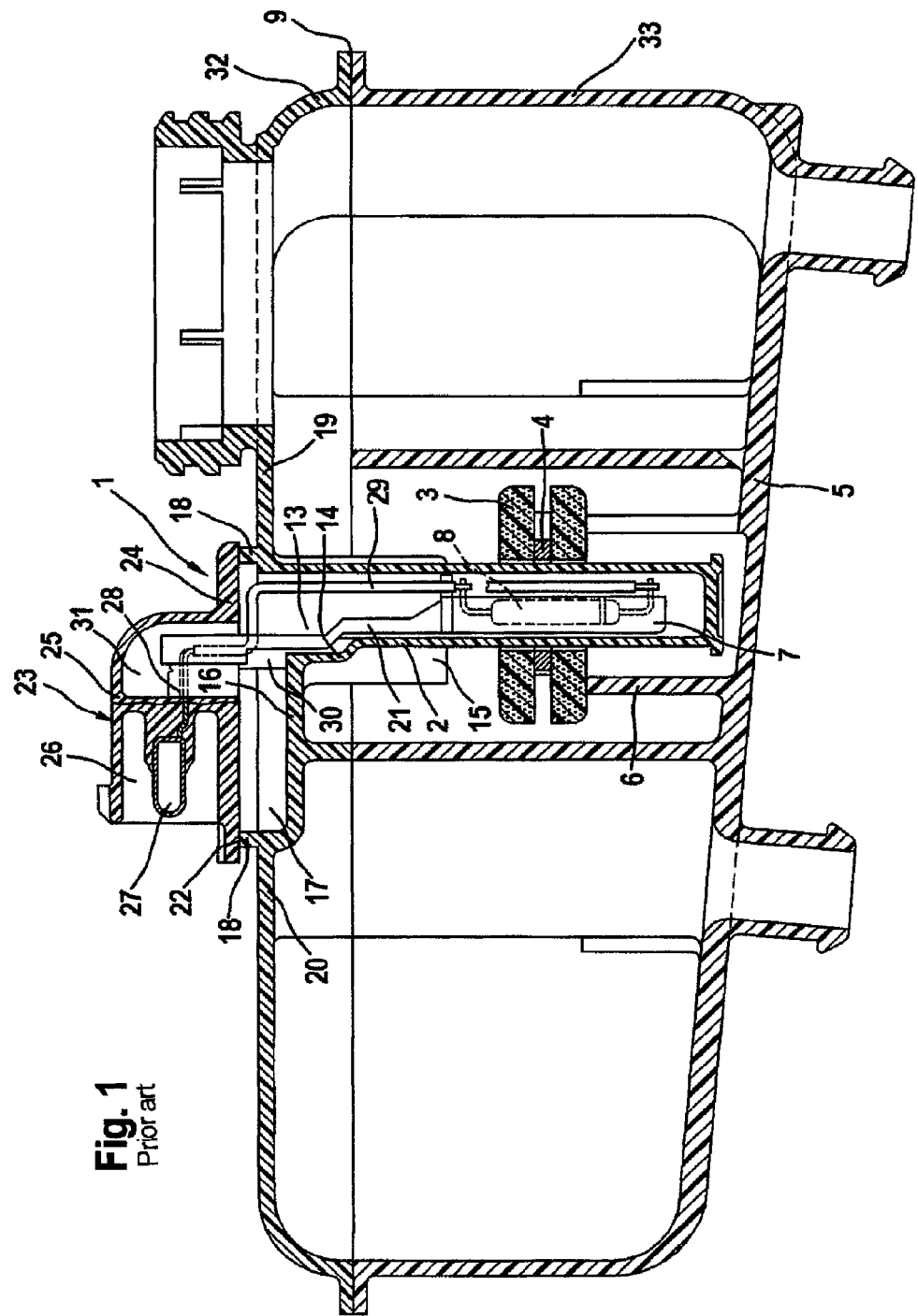
FIG. 1 shows a known compensating tank in longitudinal section.

FIG. 1 shows a known compensating tank 1 for brake fluid according to DE 37 16 135 A1, having a device for monitoring the tank filling level. The compensating tank 1 is fastened, for example, to a master cylinder (not illustrated) of a vehicle brake system and has a guide tube 2 which projects into the interior of said compensating tank 1 and which is closed off at its end facing toward the interior of the tank. A float 3, which is for example designed as a ring and forms a constituent part of a device for monitoring the tank filling level, is arranged so as to be movable along the guide tube 2, which has for example a circular cross section. The float 3 supports an annular magnet 4 as a magnetic transducer. A pipe stub 6 which projects upward from the base 5 of the compensating tank 1 and which partially concentrically surrounds the guide tube 2 is provided as a stop for the float 3. Said stop defines the lowest position of the float in the compensating tank 1 and prevents the float 3 from being able to leave the guide tube 2. Known measures for securing the float are also spreading elements arranged at the end of the guide tube 2.

The device for monitoring the tank filling level comprises a switching unit having a cover 23 and having a support 7 which is provided in the interior of the guide tube 2 and to which is fastened a reed switch 8 as a switching element. When the magnet 4 passes the switching point S of the switching element as a result of the tank filling level falling, the reed contact closes or opens and a signal is generated for an electronic switching unit of the motor vehicle brake system. A vane 21 is fastened to the support 7, which vane 21 extends parallel to the longitudinal axis of the guide tube 2 and projects into an inner slot 13 of a radial projection 14 of the guide tube 2. The guide tube 2 is provided with a plurality of ribs 15 which are arranged so as to be offset symmetrically with respect to one another on the surface of said guide tube 2, which ribs 15 form the upper stop for the float 3.

At its upper end, the guide tube 2 merges into a base 16 of a flat cavity 17 whose side walls 18 are connected to walls 19, 20 of the compensating tank 1. The side walls 18 project a short distance beyond the walls 19, 20 of the compensating tank 1 and, with their upper edges 22, form stop surfaces for the cover 23 which comprises a planar base plate 24 from which a plug connector housing 25 projects upward, which plug connector housing 25 is provided so as to be welded to the side walls 18. The plug connector housing 25 is provided with a recess 26 into which project two contact pins 27 or blade contacts of a plug connector which is inserted in a gas-tight or liquid-tight fashion into the plug connector housing 25. That end 28 of each contact pin 27 which is situated opposite the recess 26 is connected to the end of an electrical line 29. The other ends of the electrical lines 29 are connected to the reed switch 8.

Two projections 30 which form a short continuation of the walls on opposite sides of the slot 13 project into the cavity 17, which projections 30 are for example no higher than the side walls 18. The vane 21 extends into the space between the projections 30. In the plug connector housing 25, a recess 31 is provided in the part situated above the projections 30, into which recess 31 the end of the vane 21 and if appropriate the projections 30 may project when the cover 23 closes off the cavity 17. The compensating tank 1 is composed of a housing comprising a housing upper part 32 and a housing lower part 33 which are welded to one another at their edges 9.

The float 3 of the device for monitoring the tank filling level is provided in one piece and has a radial cutout into which the annular magnet 4 is inserted. Here, side walls of the cutout are provided with retaining means which secure the magnet 4 in its installed position.

FIGS. 2 to 5 show a housing upper part 41 of a compensating tank 40 according to aspects of the invention in a three-dimensional illustration and partially in section. Since the compensating tank 40 according to aspects of the invention differs from the known compensating tank according to FIG. 1 merely by its switching unit 43 and the arrangement thereof on the housing, only those constituent parts of the compensating tank 40 which may be essential to the invention are illustrated and are described below. Identical components are provided with the same reference symbols, and no repeated description is given.

Figure 2:
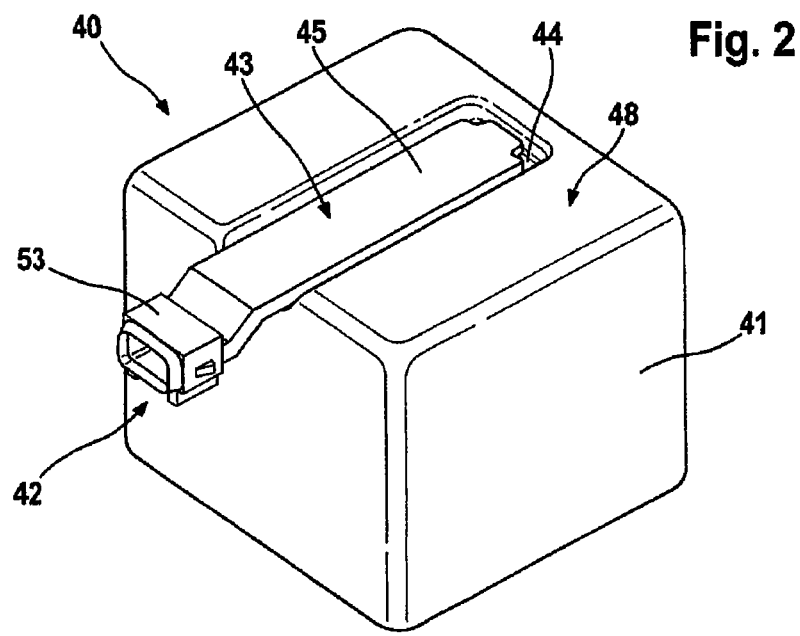
FIG. 2 shows a housing upper part of a compensating tank according to aspects of the invention with a welded switching unit in a three-dimensional illustration.
Figure 3:
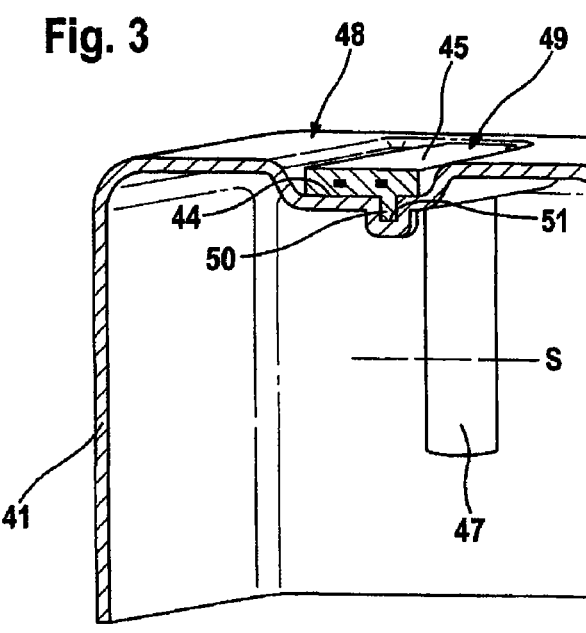
FIG. 3 shows the housing upper part as per FIG. 2 in section.

FIGS. 2 and 3 show the schematically illustrated housing upper part 41 of the compensating tank 40 according to aspects of the invention with its welded switching unit 43 of a device 42 for monitoring the tank filling level in a three-dimensional illustration, with FIG. 3 being illustrated as a section in the region of the switching unit 43.

As can be seen, the housing upper part 41 has a depression 44 in which the switching unit 43 is held after assembly and after having been welded to the housing upper part 41.

Figure 4:
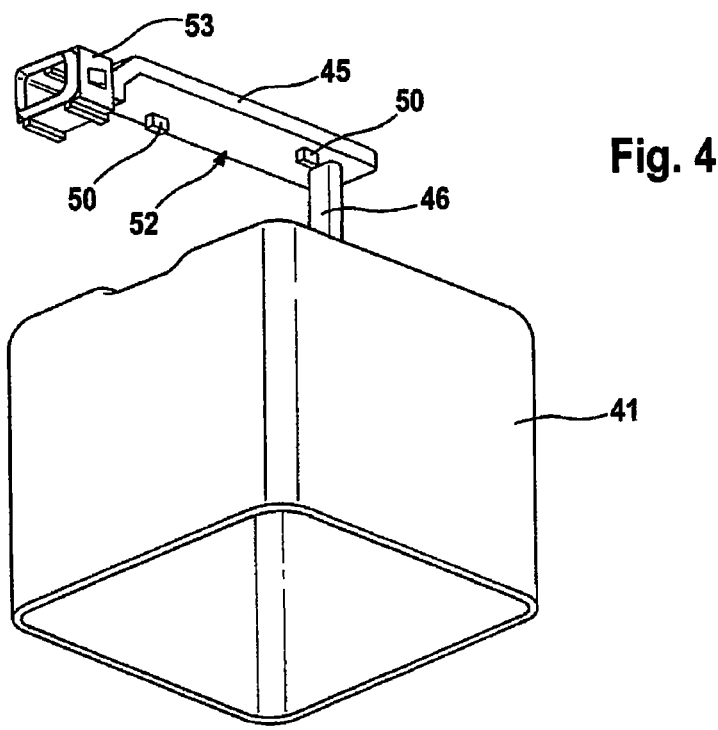
FIGS. 4 and 5 show the housing upper part as per FIG. 2 before the welding of the switching unit, in a three-dimensional illustration.

In contrast to the switching unit of the known compensating tank, the switching unit 43 has a base body 45 composed of plastic with an integrally formed plug connector housing 53 of a plug connector, with a support element 46, shown in FIG. 4, for the sensor or switching element 8 (not illustrated) being arranged on and connected to the base body 45 at right angles to a longitudinal axis of the base body 45. The support element 46, on which the sensor or switching element 8 is arranged, may for example be embodied as a printed circuit board. According to a further refinement, the support element 46 may also be injection-molded on the base body 45, with the lines being provided here so as to be injection-molded in the support element 46. It is conceivable here for the support element 46 to be designed so as to have a receptacle for the sensor or switch element 8, as a result of which said switch element 8 is protected in particular when being transported. The support element 46 is therefore either provided in one piece with the base body 45 or is fastened to the base body 45 before the assembly of the switching unit 43. An additional fastening of the support element 46 during the assembly of the compensating tank 40 can be dispensed with.

After assembly, the support element 46, surrounded by a guide tube 47 which is integrally formed on the housing upper part 41, projects into a tank interior space. As already described with regard to FIG. 1, a float 3 with a magnetic transducer 4 is arranged so as to be movable along the guide tube 47 which has a circular or rectangular cross section, which float 3 is designed for example as a ring and forms a constituent part of the device 42 for monitoring the tank filling level.

As can be seen in particular from FIG. 3, the base body 45 and the housing upper part 41, that is to say the upper sides 48,49 thereof, form a planar surface. The base body 45 therefore does not project from the upper side 48 of the housing upper part 46 and thereby cannot have a hindering effect either during transportation or during assembly of the compensating tank 40. Furthermore, the fact that the switching unit 43 is held in the depression 44 permits pre-positioning, such that the welding of the switching unit 43 to the housing upper part 41 can be improved.

For precise positioning of the switching unit 43, means for the positioned welding of the switching unit 43 are provided in the depression 44 of the housing upper part 41. Said means are suitable for defining and ensuring an axial position of the switching point S in relation to a longitudinal axis of the compensating tank 40. In this way, precise welding can be achieved since welding allowances of the switching unit 43 and housing upper part 41 are situated precisely opposite one another, and a lateral offset of the welding allowances during the welding process is prevented.

Leaks or premature damage not readily apparent externally are therefore prevented during the welding of the compensating tank 40.

Figure 5:
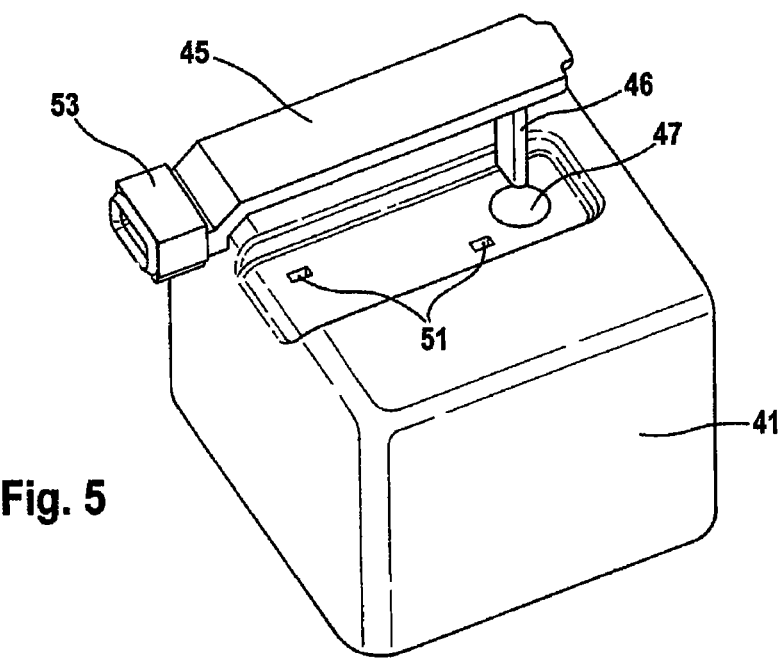

As can be seen in particular from FIGS. 4 and 5, at least one projection-recess arrangement 50,51 is provided as means for positioned welding, with the means being provided on the underside 52 of the base body 45 and in the depression 44.

It is preferable for two projections 50 which are offset with respect to one another to be provided on the underside 52 of the base body 46, and for corresponding recesses 51 to be provided in the region of the depression 44.

Welding allowances (not illustrated) on the housing upper part 41 in the region of the depression 44 and on an underside 52 of the base body 45 are designed and coordinated with the projection-recess arrangements 50,51 in such a way that a predefined position of the switching point S can be ensured.

It can also be seen from FIG. 2 that the plug connector housing 53 is provided so as to be radially offset in the direction of the housing upper part 41 in relation to the longitudinal axis of the base body 45. An advantage of said arrangement is that a particularly compact compensating tank 40 is provided.

As a result of the described design of the compensating tank 40, an optimum welded connection of the housing upper part 41 and switching unit 43 is obtained while maintaining the prescribed switching point S, and the 100% pressure test by the manufacturer and the production line filling process are overcome without problems.

As already mentioned above, the device 42 for monitoring the tank filling level may also be arranged in the housing lower part of the compensating tank 40, with the invention not being restricted to a compensating tank for a motor vehicle brake system, but rather being applicable in any compensating tank which requires monitoring of the filling level.

While preferred embodiments of the invention have been described herein, it will be understood that such embodiments are provided by way of example only. Numerous variations, changes and substitutions will occur to those skilled in the art without departing from the spirit of the invention. It is intended that the appended claims cover all such variations as fall within the spirit and scope of the invention.

The invention claimed is:

1. A compensating tank for a hydraulic motor vehicle brake system comprising:
   a housing including a housing upper part and a housing lower part;
   a device for monitoring a filling level of the compensating tank, said device including a switching unit, which is attached to the housing and has a plug connector, and a sensor which is configured to be switched by a transducer at a switching point (S) at which the switching unit generates a signal for an electronic control unit, wherein the housing includes a depression for receiving the switching unit, with the switching unit having an elongated base body which extends between the plug and a support element that is positioned within the housing and includes an underside surface which is attached to the housing in the depression, wherein the depression is sized such that a topside surface of the base body of the switching unit and a planar topside surface of the housing are substantially co-planar to form a substantially continuous surface on the topside surface of the housing; and
   means for aligning the switching unit that are provided in the depression of the housing, said means for alignment being configured for maintaining a pre-determined position of the switching point (S) with respect to the compensating tank,
   wherein the elongated base body is welded to the housing in the depression,
   wherein the means for alignment comprise a projection-recess arrangement, and
   wherein projections are provided on the underside surface of the elongated base body and recesses are arranged in the depression for receiving the projections.

2. The compensating tank as claimed in claim 1, wherein the depression is provided on the housing upper part.

3. The compensating tank as claimed in claim 1, wherein a plug connector housing of the plug connector is vertically offset from the base body.

4. The compensating tank as claimed in claim 1, wherein the switching unit includes the support element which is connected to the base body and extends in a perpendicular direction with respect to the base body to project into a tank interior space, and wherein the sensor is arranged on the support element.

5. The compensating tank as claimed in claim 4, wherein the support element is provided in the form of a printed circuit board.

6. The compensating tank as claimed in claim 4, wherein the support element is configured to be injection molded to the base body.

7. The compensating tank as claimed in claim 1, wherein the base body is composed of plastic.

8. The compensating tank as claimed in claim 1, wherein contact pins are embedded within the elongated body.

9. The compensating tank as claimed in claim 1, wherein the plug extends over a side of the housing.

10. The compensating tank as claimed in claim 1, wherein the plug is not positioned in the depression.

* * * * *